United States Patent [19]

Chamberlain et al.

[11] Patent Number: 5,276,101
[45] Date of Patent: Jan. 4, 1994

[54] MELT METALATION OF BLOCK COPOLYMERS

[75] Inventors: Linda R. Chamberlain, Richmond; Philip A. DeFriend, Houston, both of Tex.

[73] Assignee: Shell Oil Company, Houston, Tex.

[21] Appl. No.: 866,281

[22] Filed: Apr. 10, 1992

Related U.S. Application Data

[63] Continuation-in-part of Ser. No. 571,367, Aug. 23, 1990, abandoned.

[51] Int. Cl.$^5$ ............................................. C08F 297/04
[52] U.S. Cl. .................................... 525/314; 525/250; 525/331.9; 525/332.9; 525/333.3; 525/337; 525/342; 525/343; 525/366; 525/374; 525/383; 528/392
[58] Field of Search ............... 525/250, 314, 331.9, 525/332.9, 333.3, 337, 342, 343, 366, 374, 383; 526/335, 337, 340; 528/392

[56] References Cited

U.S. PATENT DOCUMENTS

| | | | |
|---|---|---|---|
| 3,780,139 | 12/1973 | Sutter et al. | 260/880 B |
| 3,976,628 | 8/1976 | Halasa et al. | 526/22 |
| 4,145,298 | 3/1979 | Trepka | 252/51.5 A |
| 4,254,238 | 3/1981 | Foss et al. | 525/366 |
| 4,409,357 | 10/1983 | Milkovich | 524/505 |
| 4,707,521 | 11/1987 | Esneault et al. | 525/250 |
| 4,783,503 | 11/1988 | Gergen et al. | 525/366 |
| 4,868,243 | 9/1989 | Gelles et al. | 525/366 |
| 4,868,245 | 9/1989 | Pottick et al. | 525/98 |
| 4,882,384 | 11/1989 | Willis et al. | |
| 4,906,687 | 3/1990 | Modic | 525/98 |
| 4,927,889 | 5/1990 | Shiraki et al. | 525/285 |
| 4,972,020 | 11/1990 | Shiraki et al. | |
| 5,003,012 | 3/1991 | Chamberlain et al. | 525/366 |
| 5,066,726 | 11/1991 | Modic | 525/314 |
| 5,073,600 | 12/1991 | Gorman et al. | 525/285 |
| 5,206,300 | 4/1993 | Chamberlain | 525/314 |

FOREIGN PATENT DOCUMENTS

| | | |
|---|---|---|
| 0220602 | 10/1986 | European Pat. Off. |
| 0294951 | 10/1991 | Fed. Rep. of Germany ...... 525/366 |
| 2-281001 | 11/1990 | Japan ................................. 525/366 |

*Primary Examiner*—Vasu S. Jagannathan
*Attorney, Agent, or Firm*—Donald F. Haas

[57] ABSTRACT

A process is provided to functionalize hydrogenated block copolymers of vinyl aromatics and conjugated diolefin in a melt phase. The functionality is predominantly grafted to vinyl aromatic blocks by this process. The process is preferably performed in an extruder.

18 Claims, No Drawings

MELT METALATION OF BLOCK COPOLYMERS

This is a continuation-in-part, of application Ser. No. 571,367, filed Aug. 23, 1990 now abandoned.

FIELD OF THE INVENTION

This invention relates to a process to modify block copolymers of vinyl aromatics and hydrogenated conjugated diolefins.

BACKGROUND OF THE INVENTION

Block copolymers of conjugated diolefins and vinyl aromatics are useful as elastomeric thermoplastics. The conjugated diolefin segments and the vinyl aromatic segments of these block copolymers are incompatible and phase separate into distinct domains. The continuous domains are rubbery conjugated diolefin domains. When at least some of the conjugated diolefin segments have vinyl aromatic segments at each end, the vinyl aromatic domains will tie together the rubbery segments. At temperatures below the vinyl aromatic domain glass transition temperatures, these copolymers act like vulcanized rubbers. By heating the copolymers to temperatures above the vinyl aromatic domain glass transition temperatures, the copolymers can be melt processed.

The properties of block copolymers can be further improved by hydrogenation of the conjugated diolefin segment. This process greatly increases the ultraviolet, thermal, and oxidative stability of the polymers.

As elastomeric thermoplastics, block copolymers of conjugated diolefin and vinyl aromatics have many excellent qualities, but also have shortcomings. As nonpolar polymers, these block copolymers are generally not sufficiently compatible with polar engineering thermoplastics to be useful as tougheners for these engineering thermoplastics. These block copolymers are also easily dissolved in many non-polar solvents. Adhesiveness to polar substrates, and green strength could also be improved. Grafting polar functional groups to the copolymers can help eleviate these shortcomings. U.S. Pat. No. 4,628,072 discloses a method to graft alpha-beta unsaturated carboxylic acids or anhydrides to base block copolymers, and discloses advantages of these functionalized block copolymers as tougheners for various polar engineering thermoplastics. This method of functionalization incorporates the grafted groups mainly into the conjugated diolefin segments. These processes can be performed in a melt phase, and are commonly achieved in an extruder. This results in a very economical process.

Functionalization of the conjugated diolefin segments of the polymer may adversely affect elastomeric properties of the block copolymer. Further, high temperature properties of those block copolymers are generally limited by the glass transition temperature of the vinyl aromatic domains. Grafting some functional groups to vinyl aromatic segments can result in ionic associations within the vinyl aromatic domains which increase the glass transition temperature of the vinyl aromatic domains. This higher glass transition temperature results in significantly improving high temperature mechanical properties. It would therefore be preferable to graft the functional groups within the vinyl aromatic segments.

U.S. Pat. Nos. 3,976,628 and 4,145,298 teach processes to graft polar functionality to vinyl aromatic segments of block copolymers. The processes taught in these patents involve metalating a base polymer with a lithium alkyl in the presence of tetraalkylethylenediamine in an inert solvent and then further reacting the grafted lithium atom with carbon dioxide to form a carboxylic lithium salt. These references teach metalation in inert solvents, and, if pertinent, subsequent functionalization in the same inert solvents. These processes result in selective functionalization of vinyl aromatic blocks, but are performed in solvents. These solution based processes are undesirable because they are more expensive than melt phase processes.

These prior art processes for metalation and further functionalization of hydrogenated copolymers of vinyl aromatics and conjugated diolefins have been performed in inert solvents. Generally the solutions are 5 to 20% weight by polymer. The solvent must be heated to reaction temperatures and separated from the functionalized polymer when the reactions are finished. This adds considerable time and expense to the process. Accomplishing this process in a melt i.e. solvent free, would therefore be preferred.

Some functionalization chemistries are known to be possible in the melt phase. For example, U.S. Pat. No. 5,066,726 discloses a process to graft epoxy containing functional monomers onto a base polymer of the type discussed herein. This is a free radical process which requires the use of a free radical initiator. In free radical chemistry, it is known to use different initiators when operating at different temperatures, i.e., some initiators are good only for lower temperatures and others are good for use at higher temperatures.

In contrast, in metalation chemistry, one has to use the same initiators at high temperatures as are known to be useful in a lower temperature solution process because higher temperature stable alternatives are not available. It is well known that metal alkyls are unstable at higher temperatures. For example, "The Pyrolysis of Unsolvated Alkyl Lithium Compounds" by Glaze et al., *Journal of Organic Chemistry*, August 1966, pages 2643–2645, discusses how such alkyl lithium compounds including sec-butyl lithium, thermally decompose at temperatures in the range of 82°–100° C. Also, "Organometallic Chemistry. XII. The Thermal Decomposition of n-butyl Lithium, A Kinetic Study" by Finigan et al., *Journal of Organic Chemistry*, December 1965, pages 4138–4144, discusses the thermal decomposition of n-butyl lithium to butene-1 and lithium hydride at temperatures in the range of 100°–150° C. Finally, "The Rate of Ethylene Polymerization Initiated by Various Chelating Tertiary Diamine: n-butyl Lithium Complexes" by Marshall et al., *Journal of Applied Polyer Science, Volume* 42, pages 533–541 (1991), discusses the composition of butyl lithium in the presence of a diamine at temperatures within these ranges. Thus, it is apparent in the art that these compounds are unstable at these temperatures and that makes it unlikely that metalation, which requires these compounds, could be carried out in the melt because of the higher temperatures required for melt metalation rather than solution metalation.

There are a number of chemistries which have not worked in melt form on copolymers like those discussed herein. For example, neither sulfonation nor epoxidation of this type of polymer will work in the melt. Also, melt metalation to specifically add functionality to the vinyl aromatic hydrocarbon block is possible according to the present invention. However, with chemistries such as carbene and nitrene, it is not possible to specifically add the functionality only to either the aromatic hydrocarbon block or the conjugated diene block.

It is therefore an object of this invention to provide a process to incorporate functional groups onto vinyl aromatic segments of hydrogenated block copolymers, wherein the process is performed in a melt phase.

SUMMARY OF THE INVENTION

The object of this invention is achieved by a process comprising the steps of:

a) providing a melt of a non-functionalized base block copolymer comprising at least one block which is predominantly vinyl aromatic monomer units and at least one hydrogenated block which is, before hydrogenation, predominantly conjugated diolefin monomer units;

b) contacting the melt of the base block copolymer with 1 to 20 millimoles (or 1 to 30 millimoles when direct injection equipment is used) of a metal alkyl per millimole of the base block copolymer at a temperature not above about 140° C. for mixing equipment which does not utilize direct injection of the metal alkyl into the melt and 180° C. for mixing equipment which does involve direct injection into the melt in the presence of a polar metalation promoter to form a metalated polymer melt; and c) contacting the metalated polymer melt with an electrophile capable of reacting with the metalated polymer to form a functionalized polymer such that at least 0.1% by weight of functionality is grafted on to the polymer so that the properties of the base polymer are altered.

The process of the present invention is a melt phase process to provide a functionalized block copolymer. The melt process utilizes an electrophile which is preferably carbon dioxide, and a metal alkyl which is preferably a lithium alkyl. In this preferred embodiment, the product of this process is a carboxylic lithium salt functionalized block copolymer. This carboxylic lithium salt can be acidified to form carboxylic acid sites, or converted to salts of other metals, or converted to other functional groups by known chemistry.

For the base block copolymer to be readily processed, or in a melt phase at a temperature of 140° C. (or 180° C.) or less, it preferably is a low molecular weight polymer. Molecular weights of about 10,000 to about 50,000 are preferred.

A polar metalation promoter, which is taught as a necessary element for metalation processes in the prior art, is also required in the melt metalation process of the present invention if operating at temperatures of about 140° C. (or 180° C.). At higher temperatures a promoter may not be necessary.

In a most preferred embodiment, the melt metalation is performed in an extruder. Performing this invention in an extruder results in better utilization of the reactants because the metal alkyl is directly injected into the polymer melt due to the efficient and rapid contacting of the reactants.

DETAILED DESCRIPTION OF THE INVENTION

The base hydrogenated block copolymers employed in the present composition are thermoplastic elastomers and have at least one vinyl aromatic polymer block A and at least one elastomeric conjugated diene polymer block B. The number of blocks in the block copolymer is not of special importance and the macromolecular configuration may be linear or branched, which includes graft, radial or star configurations.

The base hydrogenated block copolymers employed in this invention may have a variety of geometrical structures, since the invention does not depend on any specific geometrical structure, but rather upon the chemical constitution of each of the polymer blocks. The radial or star configuration may be either symmetric or asymmetric. Typical block copolymers of the most simple configuration would have the structure polystyrene-polybutadiene (S-B) and polystyrene-polyisoprene (S-I). A typical radial or star polymer would comprise one in which the diene block has three or four branches (radial) or five or more branches (star), the tip of some (asymmetric) or each (symmetric) branch being connected to a polystyrene block.

Blocks A and B may be either homopolymer, random or tapered copolymer blocks as long as each block predominates in at least one class of the monomers characterizing the blocks. Thus, blocks A may comprise styrene/alpha-methylstyrene copolymer blocks or styrene/butadiene random or tapered copolymer blocks as long as the blocks individually predominate in alkenyl arenes. The preferred vinyl aromatics are styrene and alphamethylstyrene, and styrene is particularly preferred due to its availability and relatively low cost.

Blocks B may comprise homopolymers of conjugated diene monomers, copolymers of two or more conjugated dienes, and copolymers of one of the dienes with a monoalkenyl arene as long as the blocks B predominate in conjugated diene units. The conjugated dienes are preferably ones containing from 4 to 8 carbon atoms. Examples of suitable such conjugated diene monomers include: butadiene, isoprene, 2,3-dimethyl-1,3-butadiene, and piperylene, preferably butadiene and isoprene.

The base block copolymer may contain various ratios of conjugated diolefins to vinyl aromatics. The proportion of the vinyl aromatic blocks is between about 1 and about 99 percent by weight of the block copolymer. To exhibit elastomeric properties, the proportion of the vinyl aromatic blocks in these block copolymers are preferably between about 2 and about 65 percent, and more preferably between about 5 and about 40 percent by weight.

The molecular weight of the base block copolymer is limited by that which results in a melt-processable block copolymer at a temperature of about 140° C. or less for mixing equipment which does not utilize direct injection of the metal alkyl into the melt and 180° C. for mixing equipment which does involve direct injection into the melt. In most instances, the vinyl aromatic blocks will have weight average molecular weights of about 2,000 to about 15,000, preferably about 3,000 to about 8,000, while the conjugated diolefin blocks either before or after hydrogenation will have weight average molecular weights of about 7,000 to about 35,000, preferably about 10,000 to about 20,000. The total weight average molecular weight of the block copolymer is typically about 10,000 to about 50,000, preferably from about 20,000 to about 40,000. These molecular weights are most accurately determined by gel permeation chromatography using a polystyrene standard.

The block copolymer may be produced by block polymerization or copolymerization procedures, including sequential addition of monomer, incremental addition of monomer, or coupling as illustrated in, for example, U.S. Pat. Nos. 3,251,905; 3,390,207; 3,598,887 and 4,219,627 which are incorporated herein by reference. Tapered copolymer blocks can be incorporated in the block copolymer by copolymerizing a mixture of conjugated diolefin and vinyl aromatic monomers utilizing the difference in their polymerization reactivity rates. Various patents describe the preparation of block copolymers containing tapered copolymer blocks including U.S. Pat. Nos. 3,251,905; 3,265,765; 3,639,521 and 4,208,356 which are incorporated herein by reference. Additionally, various patents describe the preparation of symmetric and asymmetric radial and star block copolymers which may be utilized. These include U.S. Pat. Nos. 3,231,635; 3,265,765; 3,322,856; 4,391,949; and 4,444,953; which are incorporated herein by reference.

These block copolymers are hydrogenated to increase their thermal stability and resistance to oxidation, ultraviolet and thermal degradation. Additionally, if unhydrogenated block copolymers are metalated, a significant portion of the functionality will be grafted to the conjugated diolefin blocks. Selective functionalization of vinyl aromatic blocks is accomplished when the base block copolymer is hydrogenated before functionalization. Preferably, greater than 90 percent of initial ethylenic unsaturation is hydrogenated. The hydrogenation of these copolymers may be carried out by a variety of processes including hydrogenation in the presence of such catalysts as Raney Nickel, noble metals such as platinum, palladium and the like and soluble transition metal catalysts. Suitable hydrogenation processes which can be used are ones wherein the diolefin containing copolymer is dissolved in an inert hydrocarbon diluent such as cyclohexane and hydrogenated by reaction with hydrogen in the presence of a soluble hydrogenation catalyst. Acceptable processes are disclosed in U.S. Pat. Nos. 3,113,986 and 4,226,952, which are incorporated herein by reference.

The metal alkyl of this invention is preferably an alkali metal alkyl and most preferably a lithium alkyl. The alkyl groups are usually saturated hydrocarbon radicals of any length whatsoever, but those containing no more than 4 carbon atoms are preferred. Although saturated hydrocarbon radicals are usually employed, the hydrocarbon radicals could also comprise aromatic rings or nonconjugated ethylenic unsaturation. Acceptable metal alkyls include, but are not limited to:
methyllithium;
i-propyllithium;
sec-butyllithium;
n-butyllithium;
t-butyllithium;
n-dodecyllithium;
phenyllithium;
styryllithium;
benzyllithium;
indenyllithium;
1-lithio-3-butene;
1-lithio-cyclohexene-3;
1-lithio-cyclohexene-2;
1,4-dilithiobutane;
1,4-dilithiobenzene;
1,3,5-trilithiopentane; and
1,3,5-trilithiobenzene.

Lithium adducts of polynuclear aromatic hydrocarbons, as described in U.S. Pat. No. 3,170,903 incorporated herein by reference, can also be employed, for example, lithium adducts of biphenyl, naphthalene, anthracene or stilbene.

Polar promoters which may be utilized include those described in U.S. Pat. No. 4,145,298, which is incorporated herein by reference. Potassium tert-butoxide ($KOC_4H_9$) also may be utilized as a promoter. Tetramethylethylenediamine is the preferred polar promoter. A 2:1 molar ratio of the polar promoter to metal alkyl is generally preferred, and molar ratios of polar promoters to metal alkyls of 0.6 to 100 may be utilized. The most preferred amounts are about 2 to about 40 millimoles of promoter per millimole of polymer.

The metal alkyl and melt of the base polymer are combined in a solvent free environment. Processing oils may be present in the polymer melt to aid in polymer processing, but not in quantities exceeding 10 to 100 parts by weight based on 100 parts by weight of base block copolymer. Also, a very small of amount of solvent or oil may be used for addition of metalating reagents, or for the subsequent addition of the reacting electrophiles to the polymer melt. This amount is not to exceed more than 85% of the total weight of the reagents added. If a solvent is included, it must be capable of volatilizing from the polymer melt prior to the polymer exiting from the extruder. Larger amounts of solvent require a process step for solvent removal, which is to be avoided in the practice of this invention.

The amount of metal alkyl employed may vary over a wide range. From about 2 to about 10 millimoles per millimole of base polymer is preferred. Lesser amounts do not impart sufficient functionality to alter the properties of the base polymer whereas greater amounts may result in a functionalized polymer which is difficult to process, and may cause excessive degradation of the base polymer.

The more preferred amount of metal alkyl is between about 4 and about 8 millimoles per millimole of base polymer. The metal alkyl and the melt of the base polymer may be combined in any process equipment capable of mixing polymer melts, and also capable of excluding oxygens and other protic impurities. Brabender mixers, sigma blade mixers, Banbury mixers, which are examples of mixing equipment which do not utilize direct injection of the metal alkyl into the melt, and extruders, which is an example of mixing equipment which utilizes direct injection of the metal alkyl into the melt, are examples. Protic impurities must be excluded because they would destroy the metal alkyls, and if the metalated polymer is exposed to protic impurities the metalated sites of the polymer will react with the impurities. Contamination by protic impurities is typically prevented by utilizing a dry nitrogen cap over the polymer melt.

The class of preferred electrophiles capable of reacting with the metalated polymer include carbon dioxide, ethylene oxide, epoxides, ketones, aldehydes, esters, isocyanates, sulfur, boron alkoxides, and silicon containing compounds. Halogens, such as chlorine and bromine may also be utilized as the electrophile. Carbon dioxide generates a carboxylate or "carboxyl" functionalized polymer. Carbon dioxide is preferred because the resultant product, which contains carboxylic salt sites, where the counterion is lithium, is reactive, polar, and easily converted to other functional groups, or crosslinked with commercially available crosslinking compounds. The carboxylic lithium salt functionality may be acidified by contact with organic or inorganic acids. Acetic acid is preferred.

The electrophile capable of reacting with the metalated polymer is preferably added directly to the melt of the metalated polymer to form a melt functionalized polymer. The electrophile may be added as a liquid, solid or gas. It may be dissolved in a solvent or oil, for ease of addition to the polymer melt, but the amount of oil or solvent should not exceed more than 85% of the total weight of the added electrophile.

This functionalization may be performed in any of the equipment acceptable for the metalation reaction, and an extruder is again preferred. Most preferred is the same extruder in which the metalation was performed via a sequential injection port.

The functionalization is preferably performed at a temperature within the range of about 100° and about 140° C. for mixing equipment which does not utilize direct injection of the metal alkyl into the melt and 180° C. for mixing equipment which does involve direct injection into the melt. At lower temperatures either the polymers will not melt, or the polymer melt will be of an undesirably high viscosity. Also, the metal alkyls do not appear to have sufficient thermal stability for reaction with polymers at higher temperatures. However, it can be envisioned that reactions can be done at higher temperatures if more thermally stable metalating reagents were available.

When an extruder is utilized in the practice of the present invention, the extruder may be arranged with a feed compression and melting zone, followed by a metal alkyl injection port for direct injection of the metal alkyl into the melt, followed by a metalation reaction zone preferably having a residence time of about 10 to about 30 seconds, followed by an injection port or gas inlet for the addition of the electrophile which will react with the metalated polymer, followed by a functionalization reaction section preferably having a residence time of about 10 to about 30 seconds. There may also be a devolatilization port after either of the reaction sections to vent by-products of the metalation reaction, or excess reactants. The functionalized melt would typically be pelletized or granulated at the outlet of the extruder.

The present process is an economical method to functionalize block copolymers due to the elimination of the need to dissolve the polymers in a solvent. The functionalized block copolymer of this invention preferably contains 0.25 to 4 percent by weight (on a polymer basis) of functionality, and more preferably contains 0.5 to 2 percent by weight (on a polymer basis) of functionality.

The functionalized block copolymers of this invention have the utilities of known vinyl aromatic block functionalized block copolymers of hydrogenated conjugated diolefins and vinyl aromatics. These include lubricating oil viscosity index improvers/dispersants, and tougheners for polar engineering thermoplastics. The functionalized polymers also have higher vinyl aromatic domain glass transition temperatures, and therefore, can be used at higher service temperatures. The functionalized polymers, generally have higher tensile strengths, greater solvent resistance to non-polar solvents and improved adhesion to polar substrates than the unfunctionalized polymers.

EXAMPLE 1

A hydrogenated styrene-butadiene-styrene block copolymer was metalated in a melt to demonstrate the present invention. The polymer was 30 weight percent styrene and had a weight average molecular weight of about 22,000.

The polymer was melted in a Brabender mixing head, fitted with a nitrogen purge cap. While the melt was mixing, a 2:1 molar ratio mixture of tetramethylethylenediamine to n-butyllithium was syringed into the melt. The polymer melt instantaneously changed from colorless to a brilliant orange color, with an increase in viscosity as evidenced by an increase in torque on the mixing head. After mixing for about one minute, the nitrogen purge was replaced with a carbon dioxide purge. The metalated polymer melt was mixed under the carbon dioxide purge for about 5 minutes. Although contacting of the metalated polymer with carbon dioxide in this fashion does not completely react the grafted lithium ions, some of the metal ions were converted to carboxylic salt functionality, as observed by the bright orange color of the metalated polymer fading to yellow.

To determine the efficiency of the melt metalation process, the functionalized polymers were dissolved in carbon dioxide saturated tetrahydrofuran, carboxylating the remaining grafted lithium. The carboxylic lithium salt was then acidified by contact with acetic acid, and water washed. The polymers were dried, then dissolved, and the acid site content was determined by titration with methanolic KOH. This melt metalation was performed at varying temperatures and at two different levels of n-butyl lithium addition. The results are summarized in the Table below.

TABLE 1

| Run | Metalation Temp. °C. | Millimoles of Li-nC$_4$H$_9$ added Per Millimole of Polymer | % Grafted —COOH of Polymer |
|---|---|---|---|
| 1 | 110 | 10 | 0.5 |
| 2 | 125 | 5 | 0.1 |
| 3 | 125 | 10 | 0.4 |
| 4 | 140 | 10 | .25 |
| 5 | 165 | 10 | <0.1 |

From the Table, it can be seen that at a metalation temperature of 165° C., the metalation was not successful. At the lower temperatures an acceptable and useful level of metalation was achieved.

EXAMPLE 2

Solution Metalation Process

Using the 22,000 MW polymer specified in the melt Example 1, 10.4 grams of polymer were dissolved in 150 mls of cyclohexane. This polymer solution was placed in a three-necked, round bottom flask in a nitrogen-filled glove box. The flask was fitted with a stirrer, a thermocouple, and a heating mantle. To the polymer solution was added 0.54 grams (0.004 moles) of N,N,N',N'-tetramethylethylenediamine, and three drops of 1,1-diphenylethylene. A 12.25% cyclohexane solution of butyl lithium was added dropwise until a reddish color became noticeable in the polymer solution, indicating that any protic impurities had been removed. At this point, 1.20 grams (0.002 moles) of the 12.25% butyl lithium solution was added. The viscosity of the polymer solution increased somewhat upon addition, and the color became very deep orange. The solution was heated to 50° C. and allowed to react for one hour. The solution was then cooled to room temperature. Several pieces of dry ice were then added to the flask. The carbon dioxide was allowed to bubble through and diffuse into the polymer solution for one hour. The polymer solution became very viscous (gelled) during the carbon dioxide diffusion time, and changed from an orange color to colorless. After carboxylation, the polymer solution was treated with 250 mls of glacial acetic acid to convert the lithium carboxylates to acid sites. Upon addition of the acid, the polymer solution converted from a gel to a free flowing liquid. The solution was allowed to stir for 30 minutes. The polymer was then coagulated in isopropanol, washed with deionized water until a pH of 7 was attained, and then dried in a vacuum oven at 60° C. overnight. Titration of redissolved polymer solution with MeOH/KOH solution showed an acid functionality level of only 0.8%.

EXAMPLES 3 AND 4

Hydrogenated, polystyrene-polybutadiene-polystyrene block copolymers were metalated in the polymer melt to demonstrate the present invention. The polymers were 30% weight in polystyrene, with weight average molecular weights of 22,000 and of about 73,000. Higher polymer molecular weights require that higher temperatures be used for the polymer to be in the melt phase. The melt metalation process in the Brabender, i.e. equipment which does not allow injection of the metalating reagents directly into the polymer melt, appears to reach ceiling temperatures of approximately 140° C. for acceptable and useful levels of metalation and carboxylation to be achieved as shown in Example 1 which utilized the 22,000 molecular weight polymer. Melt metalation in an extruder, i.e. equipment which does allow injection of the metallating agents directly into the polymer melt, appears to reach ceiling temperatures of approximately 180° C. for acceptable and useful levels of metallation and carboxylation to be achieved.

EXAMPLE 3

73,000 MW Polymer in Brabender

The polymer was melted in a Brabender mixing head that had been fitted with a nitrogen purge cap. While the polymer was mixing, a 2:1 molar ratio mixture of tetramethylethylenediamine to lithium alkyl was syringed into the melt. The polymer melt instantaneously changed from colorless to a brilliant orange color. No increase in polymer viscosity was observed. After mixing for about a minute, the nitrogen purge was replaced with a carbon dioxide purge. The metalated polymer melt was mixed under carbon dioxide purge for about 5 minutes. There was no apparent color change in the polymer melt, indicating that most probably the lithiated sites did not react with the carbon dioxide added in this manner.

To determine the efficiency of the melt metalation process, the functionalized polymers were transferred from the Brabender mixing head to a nitrogen-filled glove box. The polymers were then dissolved in carbon dioxide saturated tetrahydrofuran, carboxylating the remaining grafted lithium. The lithium-salt version of the polymer was then acidified by contact with acetic acid, and water washed until a pH of 7 was attained. The polymers were then dried in a vacuum overnight. Titration of redissolved polymer solution with methanolic KOH gave the resulting acid functionally levels. Table 2 is a summary of these results.

TABLE 2

| | 73,000 MW Polymer in Brabender | | |
|---|---|---|---|
| Run | Metalation Temp °C. | Millimoles of Li alkyl added Per millimole of Polymer | % Grafted —COOH of Polymer |
| 1 | 160 | 2.5 | <0.1 (.02) |
| 2 | 160 | 2.5 | <0.1 (.04) |
| 3 | 160 | 5.0 | <0.1 (.01) |
| 4 | 160 | 5.0 | <0.1 (.00) |
| 5 | 160 | 10.0 | <0.1 (.08) |

EXAMPLE 4

22,000 or 73,000 MW Polymer in the Extruder

Preparation of the tetramethylethylenediamine/lithium alkyl (2:1 ratio) metalation catalyst was carried out in a nitrogen atmosphere glove box. The lithium alkyl was dissolved in n-decane at 20% solids concentration (to determine the total active lithium in the catalyst, the 20% n-decane solution was titrated with 1,3-diphenyl-2-propanonetosylhydrazone). Tetramethylethylenediamine was then added to the lithium alkyl solution dropwise, over 30 minutes. After addition of the tetramethylethylenediamine to the lithium solution, the prepared catalyst was then transferred to a 500 ml pressure vessel, sealed air tight, and then removed from the glove box. The pressure vessel was then connected to the reciprocal pump of the extruder, ready for injection in to the polymer melt.

The lithiation/carboxylation of saturated block copolymers (polystyrene-polybutadiene-polystyrene) was carried out in a Berstorff twin screw, 25 mm diameter, co-rotating extruder (length:diameter, 33:1 mm). A constant nitrogen gas purge was used to displace any protic impurities in both the feed hopper and at heating zones close to the feed hopper. To improve efficiency of the lithiation reaction, it was important to purge with nitrogen for at least 30 minutes prior to the extruder run, and that the purge be maintained throughout the extruder run. Generally the best screw configuration was one which maximized the mixing of the reagents with the polymer, but also had short overall polymer residence time. Catalyst was generally added at the second extruder heating zone following the zone which melts the polymer. After addition of the lithiating catalyst, the next extruder heating zone was used for reaction and mixing. Between this zone and the next, plugs or blisters were used to aid in melt sealing the barrel to separate this mixing/reaction zone from the next zone, in which the carbon dioxide was added (also helped to prevent carbon dioxide back flow). A small vacuum line was placed downstream from the carbon dioxide addition zone to prevent over pressurizing the extruder with carbon dioxide and to recover volatile materials from the polymer melt.

After the extruder was purged with nitrogen, and then melt purged clean with sacrificial polymer (all polymer used in these experiments was oven dried at 50° C. prior to use to eliminate catalyst die-out from moisture that may be present in the polymer), the extruder reciprocal pump was started and catalyst was injected into the polymer melt stream at 200 psig and at a catalyst feed rate of 22 grams per minute. The polymer feed rate was about 50 grams of polymer per minute. The vacuum line was opened to the extruder and was set at 8 inches of Hg. When the molten polymer exiting the extruder became dark orange in color, signifying that the lithiation reaction was successful, the carbon dioxide gas was introduced into the extruder. The flow rate of carbon dioxide gas was about 50 milliliters per minute. Upon addition of carbon dioxide gas, the pressure at the die of the extruder increased 10-fold, the melt temperature of the polymer increased on average 30° C. and the color of the exiting polymer became light yellow to white in color. The exiting polymer was then either water cooled and pelletized, or was collected onto a metal surface, air cooled and then diced. The total extruder run time was dependent on catalyst supply, but generally was about 15 to 20 minutes in length.

To acidify the polymer containing the lithium carboxylate salts, the polymer was redissolved in cyclohexane and treated with acetic acid. The polymer was then coagulated in isopropanol and water washed until a pH of 7 was attained. The polymers were then dried in a vacuum oven overnight. Titration of redissolved polymer solution with methanolic KOH gave the resulting acid functionality levels. Table 3 is a summary of these results for the 22,000 MW polymer and Table 4 presents the results for the 73,000 MW polymer.

TABLE 3

22,000 MW Polymer

| Run | Metalation Temp °C. | Millimoles of Li alkyl Per millimole of Polymer | % Grafted —COOH of Polymer |
|---|---|---|---|
| 1 | 125 | 12 | 0.4 |
| 2 | 130 | 14 | 0.2 |
| 3 | 135 | 19 | 0.4 |
| 4 | 135 | 19 | 0.3 |
| 5 | 135 | 19 | 0.4 |
| 6 | 142 | 14 | 0.2 |
| 7 | 147 | 12 | 0.2 |
| 8 | 147 | 12 | 0.3 |
| 9 | 155 | 21 | 0.4 |
| 10 | 155 | 21 | 0.3 |
| 11 | 159 | 12 | 0.3 |

TABLE 4

73,000 MW Polymer

| Run | Metalation Temp °C. | Millimoles of Li alkyl Per millimole of Polymer | % Grafted —COOH of Polymer |
|---|---|---|---|
| 1 | 150 | 18 | 0.1 |
| 2 | 155 | 18 | 0.2 |
| 3 | 160 | 18 | 0.2 |
| 4 | 160 | 18 | 0.1 |
| 5 | 171 | 26 | 0.1 |
| 6 | 181 | 26 | 0.1 |
| 7 | 210 | 26 | <0.1 |
| 8 | 210 | 26 | <0.1 |

We claim:

1. A process of melt metalation of block copolymers in mixing equipment which does not utilize direct injection into the polymer melt comprising the steps of:
   a) providing a melt of a non-functionalized base block copolymer comprising at least one block which is vinyl aromatic monomer units and at least one block which is conjugated diolefin monomer units which have been hydrogenated wherein the base block copolymer is melt processable at a temperature below about 140° C.;
   b) contacting the melt of the base block copolymer with 1 to 20 millimoles of an alkali metal alkyl per mole of base block copolymer at a temperature not above about 140° C. in the presence of a polar metalation promoter to form a metalated polymer melt; and
   c) contacting the metalated polymer melt with an electrophile capable of reacting with the metalated polymer to form a functionalized block copolymer.

2. The process of claim 1 wherein the molar ratio of a metalation promoter to metal alkyl is within the range of 0.6 to 100.

3. The process of claim 1 wherein the base block copolymer is a hydrogenated styrene-butadiene-styrene triblock copolymer.

4. The process of claim 1 wherein the base block copolymer is a hydrogenated styrene-isoprene-styrene triblock copolymer.

5. The process of claim 1 wherein the base block copolymer is a hydrogenated styrene-butadiene diblock copolymer.

6. The process of claim 1 wherein the base block copolymer is a hydrogenated styrene-isoprene diblock copolymer.

7. The process of claim 1 wherein the electrophile is selected from the group consisting of ethylene oxide, epoxide, ketone, aldehyde, ester, isocyanate, sulfur, boron alkoxide and halogens.

8. The process of claim 1 wherein the electrophile is carbon dioxide.

9. The process of claim 1 wherein the alkali metal alkyl is a lithium alkyl.

10. A process of melt metalation of block copolymers in mixing equipment which utilizes direct injection into the polymer melt comprising the steps of:
   a) providing a melt of a non-functionalized base block copolymer comprising at least one block which is vinyl aromatic monomer units and at least one block which is conjugated diolefin monomer units which have been hydrogenated wherein the base block copolymer is melt processable at a temperature below about 180° C.;
   b) contacting the melt of the base block copolymer with 1 to 20 millimoles of an alkali metal alkyl per mole of base block copolymer at a temperature not above about 180° C. in the presence of a polar metalation promoter to form a metalated polymer melt; and
   c) contacting the metalated polymer melt with an electrophile capable of reacting with the metalated polymer to form a functionalized block copolymer.

11. The process of claim 10 wherein the molar ratio of a metalation promoter to metal alkyl is within the range of 0.6 to 100.

12. The process of claim 10 wherein the base block copolymer is a hydrogenated styrene-butadiene-styrene triblock copolymer.

13. The process of claim 10 wherein the base block copolymer is a hydrogenated styrene-isoprene-styrene triblock copolymer.

14. The process of claim 10 wherein the base block copolymer is a hydrogenated styrene-butadiene diblock copolymer.

15. The process of claim 10 wherein the base block copolymer is a hydrogenated styrene-isoprene diblock copolymer.

16. The process of claim 10 wherein the electrophile is selected from the group consisting of ethylene oxide, epoxide, ketone, aldehyde, ester, isocyanate, sulfur, boron alkoxide and halogens.

17. The process of claim 10 wherein the electrophile is carbon dioxide.

18. The process of claim 10 wherein the alkali metal alkyl is a lithium alkyl.

* * * * *